US012196233B2

(12) United States Patent
Lin

(10) Patent No.: US 12,196,233 B2
(45) Date of Patent: Jan. 14, 2025

(54) PNEUMATIC-HYDRAULIC CONTROL DEVICE

(71) Applicant: J.D COMPONENTS CO., LTD., Chang Hua Hsien (TW)

(72) Inventor: Yu-An Lin, Chang Hua Hsien (TW)

(73) Assignee: J.D COMPONENTS CO., LTD., Chang Hua Hsien (TW)

( * ) Notice: Subject to any disclaimer, the term of this patent is extended or adjusted under 35 U.S.C. 154(b) by 0 days.

(21) Appl. No.: 18/507,390

(22) Filed: Nov. 13, 2023

(65) Prior Publication Data

US 2024/0175454 A1 May 30, 2024

(30) Foreign Application Priority Data

Nov. 30, 2022 (TW) ................................ 111213268

(51) Int. Cl.
*F15B 15/14* (2006.01)
(52) U.S. Cl.
CPC ................. *F15B 15/1447* (2013.01)
(58) Field of Classification Search
CPC .... B62J 2001/085; B62J 1/08; F15B 15/1447; B62K 19/36
See application file for complete search history.

(56) References Cited

U.S. PATENT DOCUMENTS

2022/0170565 A1\* 6/2022 Feng .................. F16K 1/54

FOREIGN PATENT DOCUMENTS

| CA | 3133538 A1 \* | 4/2022 | ............... B62J 1/08 |
| TW | M616687 U | 9/2021 | |
| TW | 619385 U \* | 11/2021 | |
| TW | M619385 U | 11/2021 | |

\* cited by examiner

*Primary Examiner* — Abiy Teka
(74) *Attorney, Agent, or Firm* — MUNCY, GEISSLER, OLDS & LOWE, P.C.

(57) ABSTRACT

A pneumatic-hydraulic control device includes a piston seat mounted in a cylinder, a piston pin disposed in the piston seat and having an axial air channel, and an acting assembly. When the piston pin is closed, hydraulic oil cannot flow between the piston seat and the piston pin, so that the cylinder cannot be moved. When the piston pin is opened, hydraulic oil flows between the piston seat and the piston pin, so that the cylinder can be moved. The acting assembly includes a sleeve tube connected with the piston seat and an acting member connected with the piston pin and inserted in the sleeve tube to form an exhaust channel. The exhaust channel communicates with the axial air channel to eliminate negative pressure generated between the piston pin and the piston seat when the piston pin is pulled down, thereby reducing a pull-down resistance of the piston pin.

8 Claims, 14 Drawing Sheets

PNEUMATIC-HYDRAULIC CONTROL DEVICE

BACKGROUND OF THE INVENTION

1. Field of the Invention

The present invention relates to pneumatic-hydraulic cylinders and more particularly, to a pneumatic-hydraulic control device.

2. Description of the Related Art

TW M616687 discloses a pneumatic-hydraulic control valve that uses a cable to pull down the piston pin to open it, so that the first and second oil guide holes of the piston seat are not connected to each other when the piston pin is closed, but they are connected to each other when the piston pin is opened. However, when the piston pin is pulled down by the cable, a negative pressure is generated between the first force-receiving portion of the piston pin and the end wall of the piston seat, resulting in that a user needs to exert a lot of force to overcome the negative pressure to pull the piston pin, which can easily cause the cable to break. In order to solve the aforesaid problem, the piston pin is connected to the outside by setting an axial air channel to eliminate the negative pressure generated when the piston pin is pulled by the cable.

However, in the aforesaid prior art, the pneumatic-hydraulic control valve is mainly set at the bottom end of the lifting seat post, but sometimes, in order to match different styles of the lifting seat post, the pneumatic-hydraulic control valve needs to be set at the top end of the inner tube, such as the embodiment disclosed by TW 619385. At this time, an acting rod is provided to drive the piston pin to move up and down. However, due to the longer length of the acting rod and strength considerations, the acting rod cannot provide an axial air channel inside to eliminate the negative pressure, so that the user still needs to exert a sufficient force to overcome the negative pressure to open the valve. Therefore, the aforesaid prior art is inconvenient to operate, and there is still a possibility of the cable breaking.

SUMMARY OF THE INVENTION

It is one objective of the present invention to provide a pneumatic-hydraulic control device, which can reduce a pull-down resistance.

To attain the above objective, the pneumatic-hydraulic control device of the present invention comprises a cylinder, a control valve, and an acting assembly. The control valve includes a piston seat and a piston pin. The piston seat is mounted in the cylinder to form a first inner oil area, a second inner oil area located below the first inner oil area, and an outer oil area communicating with the second inner oil area with the cylinder. The piston seat has a first oil guide hole communicating with the first inner oil area and a second oil guide hole communicating with the second inner oil area. The piston pin is disposed movably up and down in the piston seat, and the outer surface of the piston pin has a force-receiving portion between the first oil guide hole and the second oil guide hole. When the piston pin is located at a close position, the first and second oil guide holes of the piston seat are blocked by the force-receiving portion of the piston pin, so that the first and second oil guide holes of the piston seat do not communicate with each other, and when the piston pin is located at an open position, the first and second oil guide holes of the piston seat are not blocked by the force-receiving portion of the piston pin, so that the first and second oil guide holes of the piston seat communicate with each other. In addition, the piston pin has an axial air channel through top and bottom ends thereof, and the bottom end of the piston pin has an air hole communicating with the axial air channel. The acting assembly includes a sleeve tube having a top end thereof connected with the piston seat, and an acting member penetrated in the sleeve tube to form an exhaust channel with the sleeve tube. The exhaust channel having top and bottom ends thereof communicating with the air hole and the outside, respectively. The acting member has a top end thereof connected with the bottom end of the piston pin, so that the acting member drives the piston pin to move from the close position to the open position.

It can be seen from the above that the pneumatic-hydraulic control device of the present invention uses the acting member to directly pull the piston pin along the axial direction of the piston pin to open it. When the piston pin is pulled down, the residual air between the piston seat and the piston pin flows through the axial air channel and the air hole to reach the exhaust channel, and finally discharges from the exhaust channel to the outside. This can prevent a negative pressure from being generated between the piston seat and the piston pin, thus reducing the operating resistance caused to the piston pin.

Preferably, the cylinder includes an outer tube and an inner tube. The first and second inner oil areas are located between the inner tube and the piston seat. The outer oil area is located between the outer tube and the inner tube. The cylinder further includes an air area located between the outer tube and the inner tube and located above the outer oil area.

Preferably, a floating piston is provided between the outer tube and the inner tube and disposed movably up and down between the air area and the outer oil area to separate the air area and the outer oil area.

Preferably, the cylinder further includes an outer bottom cover mounted to a bottom end of the outer tube, and an inner bottom cover inserted in the outer bottom cover and mounted to a bottom end of the inner tube. The outer bottom cover and the inner bottom cover are penetrated by the sleeve tube. The second inner oil area and the outer oil area communicate with each other through a communicating hole provided by the inner bottom cover.

Preferably, the top end of the acting member is screwed to the bottom end of the piston pin, so that they maintain a sufficient bonding strength and can be moved synchronously.

Preferably, a barrel cap is provided at a top end of the piston seat. When the piston pin is located at the open position, an air chamber communicating with the axial air channel is formed between the barrel cap and the top end of the piston pin. The residual air in the air chamber will be discharged to the outside through the axial air channel, the air hole and the exhaust channel, thereby preventing the negative pressure from being generated in the air chamber.

Other advantages and features of the present invention will be fully understood by reference to the following specification in conjunction with the accompanying drawings, in which like reference signs denote like components of structure.

DETAILED DESCRIPTION OF THE INVENTION

Figure 1:
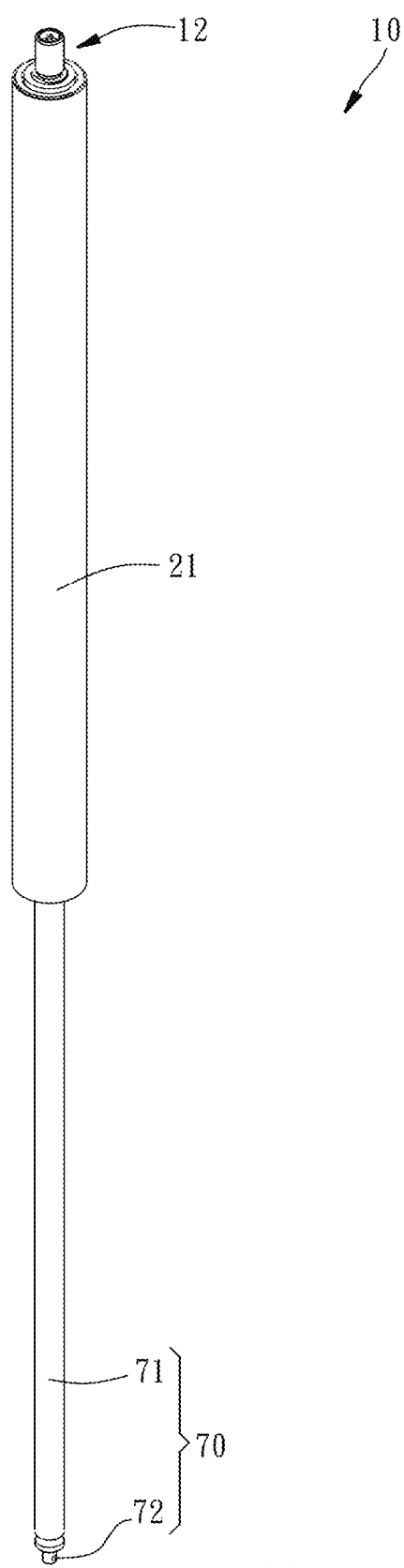
FIG. 1 is a perspective view of a pneumatic-hydraulic control device of the present invention, in which the acting assembly is in an extended state.

As shown in FIG. 1, a pneumatic-hydraulic control device 10 of the present invention comprises a cylinder 20, a control valve 30, and an acting assembly 70.

Figure 2:
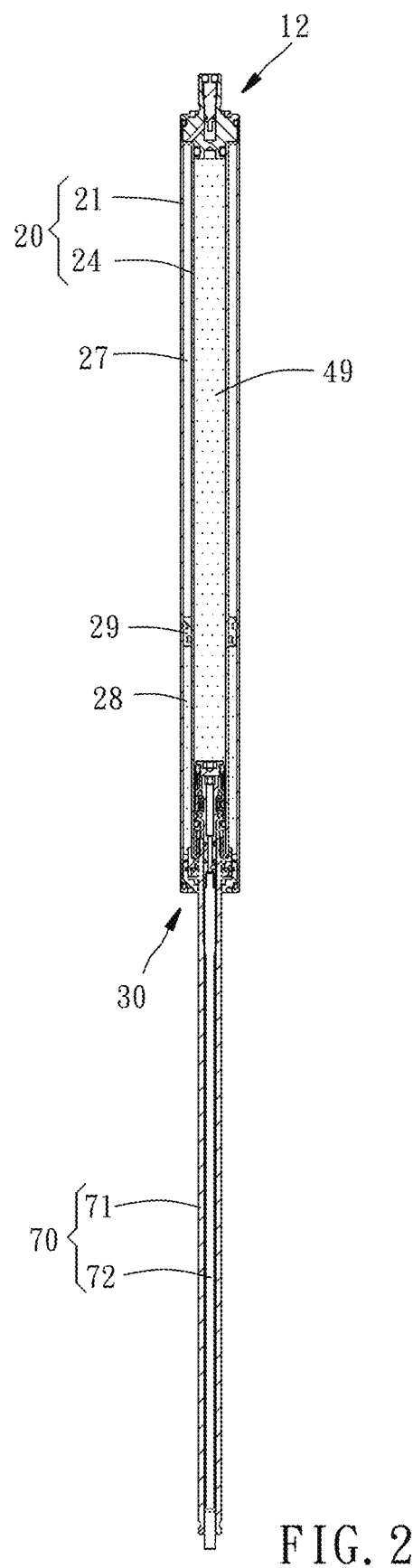
FIG. 2 is a sectional view of the pneumatic-hydraulic control device of the present invention, in which the acting assembly is in the extended state.
Figure 4:
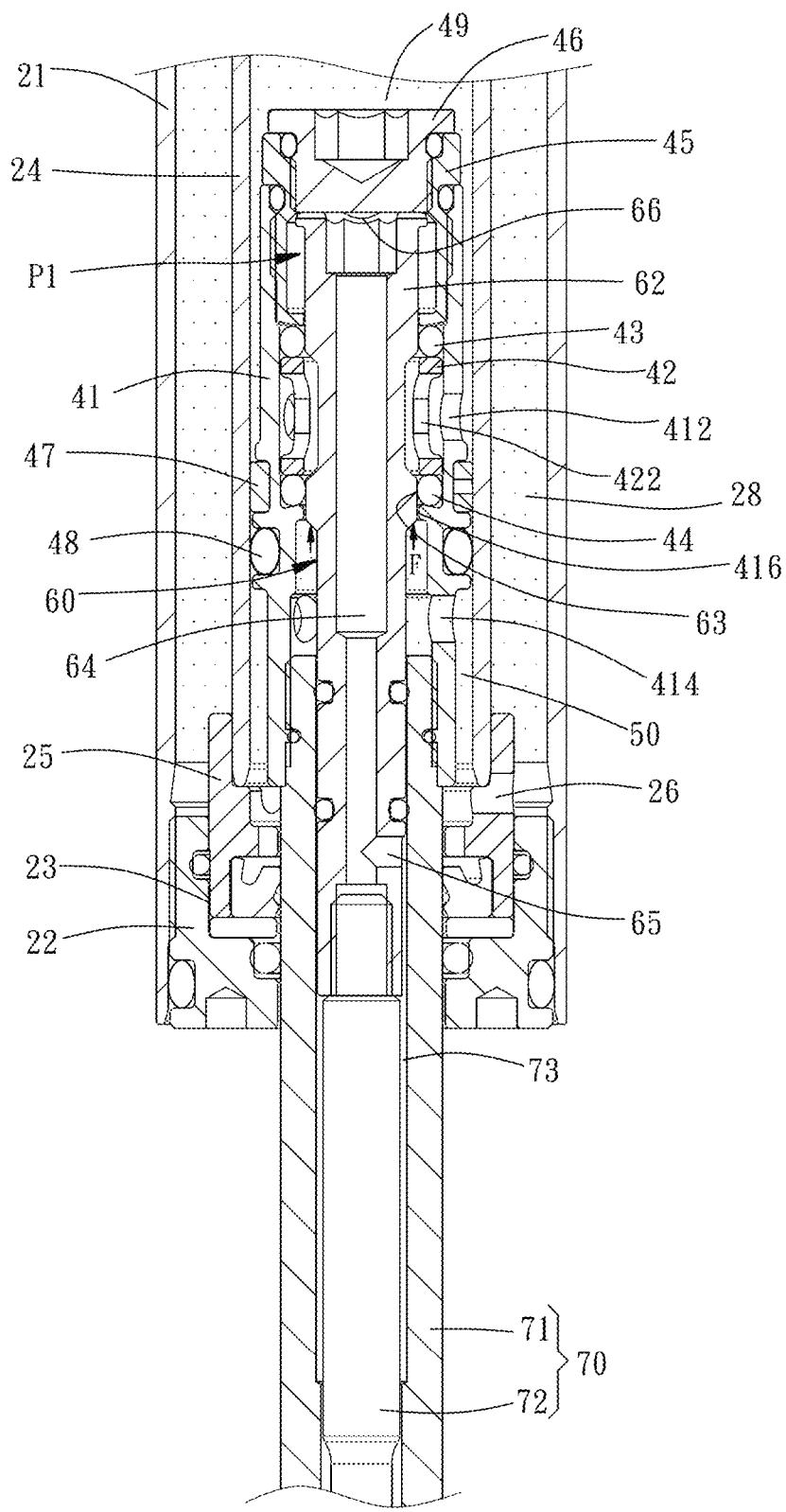
FIG. 4 is an enlarged view of FIG. 2, showing that the piston pin is located at the close position.

The cylinder 20 includes an outer tube 21 and an inner tube 24 in this embodiment. As shown in FIG. 4, the bottom end of the outer tube 21 is connected with an outer bottom cover 22. The outer bottom cover 22 has an insertion groove 23 with an opening facing upwards. The bottom end of the inner tube 24 is connected with an inner bottom cover 25. The lower half of the inner bottom cover 25 is inserted into the insertion groove 23 of the outer bottom cover 22, and the upper half of the inner bottom cover 25 is located outside the insertion groove 23 and provided with a plurality of communicating holes 26 (in this embodiment, the communicating hole 26 is, but not limited to, five in number; in fact, at least one is sufficient) arranged in a spaced manner. As such, as shown in FIG. 2, an air area 27 and an outer oil area 28 located below the air area 27 are formed between the outer tube 21 and the inner tube 24. The air area 27 and the outer oil area 28 are separated by a floating piston 29 that can be moved up and down. The outer oil area 28 is also connected to the communicating holes 26 of the inner bottom cover 25. In addition, an air inlet valve 12 is provided at the top end of the outer tube 21 and the top end of the inner tube 24 for replenishing air to the air area 27. Since how to replenish the air is conventional and not the key point of the invention, the detailed configuration will not be repeatedly mentioned hereunder.

Figure 3:
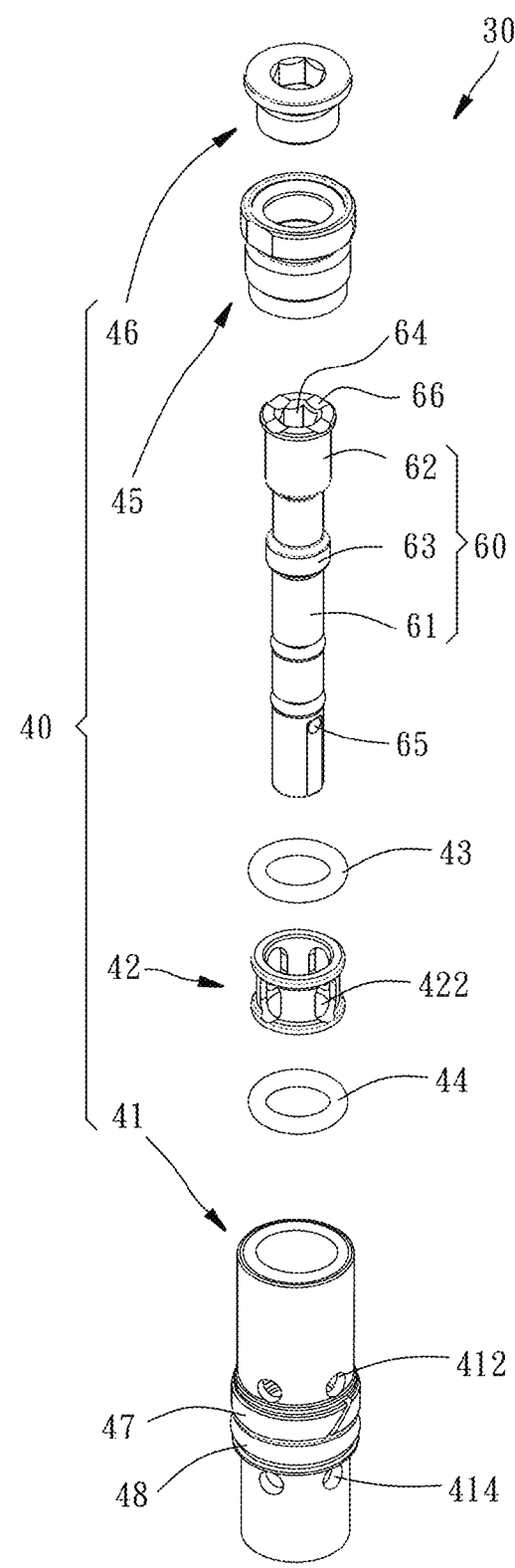
FIG. 3 is an exposed view of a control valve provided by the pneumatic-hydraulic control device of the present invention.

The control valve 30 includes a piston seat 40 and a piston pin 60. The piston seat 40 is mounted in the inner tube 24 of the cylinder 20, including a seat body 41, an adjusting ring 42, a piston barrel 45, and a barrel cap 46. As shown in FIGS. 3 and 4, the seat body 41 has a plurality of first oil guide holes 412 (in this embodiment, the first oil guide hole 412 is, but not limited to, six in number; in fact, at least one is sufficient) and a plurality of second oil guide holes 414 (in this embodiment, the second oil guide hole 414 is, but not limited to, six in number; in fact, at least one is sufficient). The first oil guide holes 412 are located above the second oil guide holes 414. In addition, the inner surface of the seat body 41 has an inner flange 416 located between the first oil guide holes 412 and the second oil guide holes 414. The outer surface of the seat body 41 is provided with a bushing ring 47 and a sealing ring 48 located below the bushing ring 47. The bushing ring 48 and the sealing ring 48 are abutted against the inner surface of the inner tube 24, so that a first inner oil area 49 and a second inner oil area 50 located below the first inner oil area 49 are formed between the seat body 41 and the inner tube 24. The first inner oil area 49 communicates with the first oil guide holes 412, and the second inner oil area 50 communicates with the second oil guide holes 414. The adjusting ring 42 is disposed in the seat body 40 and has a top end thereof abutted against the first sealing ring 43 and a bottom end thereof abutted against a second sealing ring 44 abutted against the inner flange 416 of the piston seat 40. Further, the adjusting ring 42 has a plurality of third oil guide holes 422 (in this embodiment, the third oil guide hole 422 is, but not limited to, four in number; in fact, at least one is sufficient). The third oil guide holes 422 of the adjusting ring 42 communicate with the first oil guide holes 412 of the piston seat 40. The piston barrel 45 is disposed in the piston seat 40 and has a bottom end thereof abutted against the first sealing ring 43. The barrel cap 46 is provided at the top end of the piston seat 40.

Figure 5:
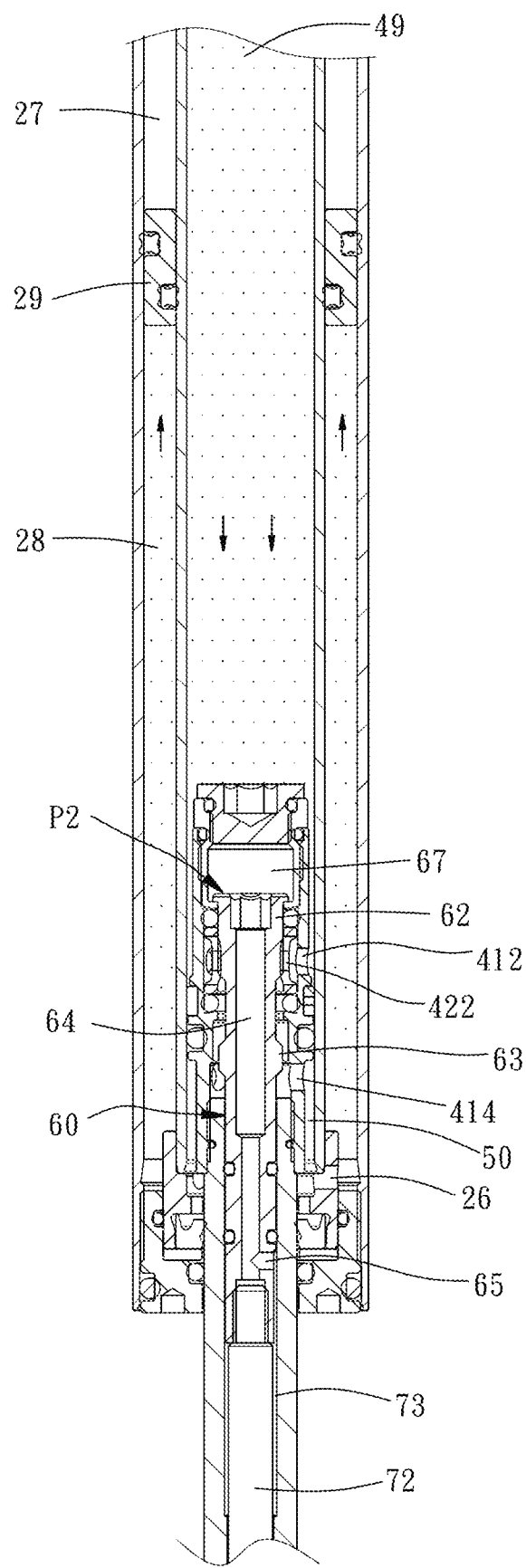
FIG. 5 is similar to FIG. 4, showing that the piston pin is located at the open position.
Figure 6:
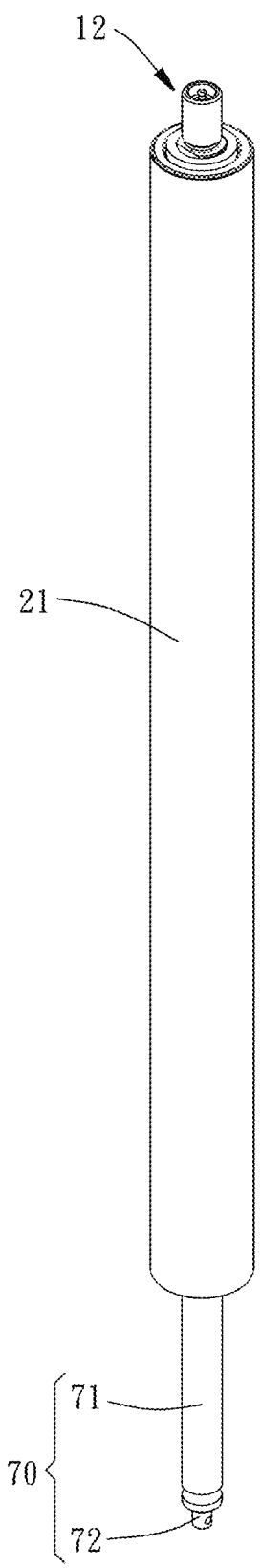
FIG. 6 is a perspective view of a pneumatic-hydraulic control device of the present invention, in which the acting assembly is in a shortened state.
Figure 7:
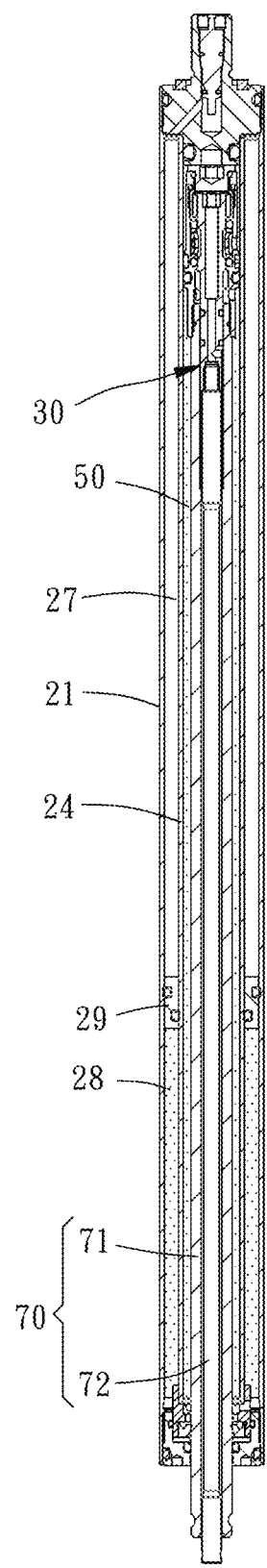
FIG. 7 is a sectional view of the pneumatic-hydraulic control device of the present invention, in which the acting assembly is in the shortened state.
Figure 8:
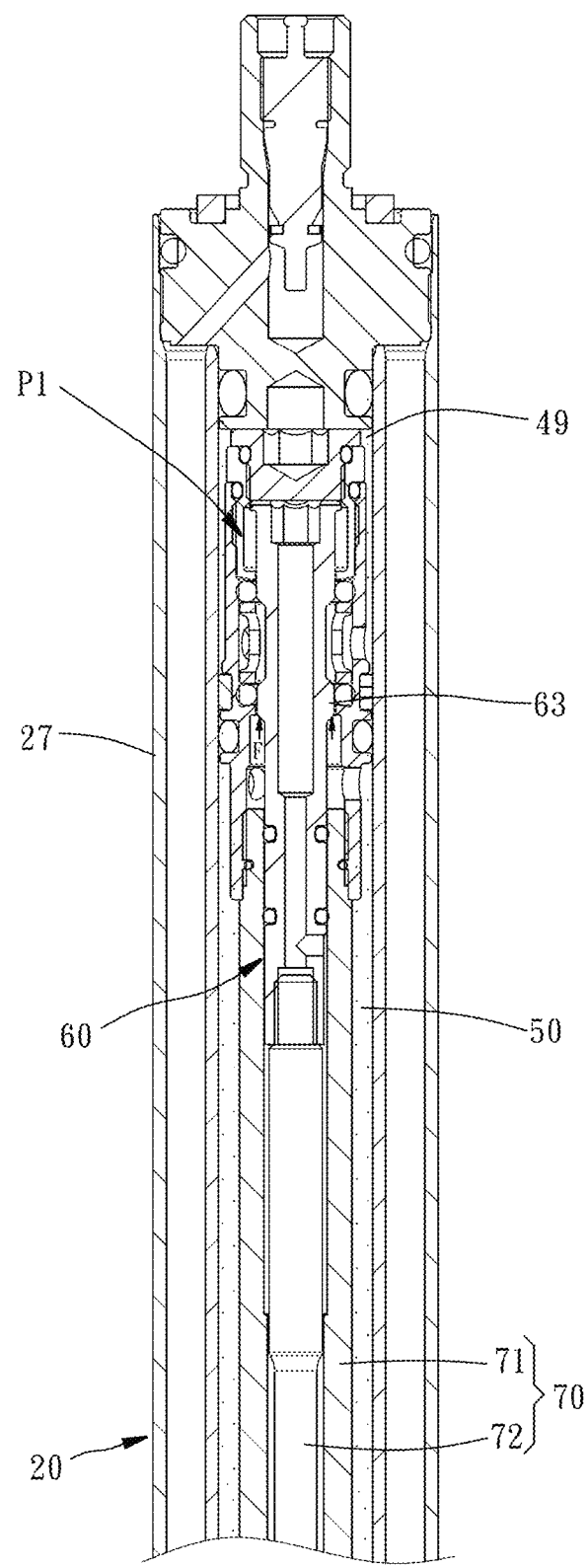
FIG. 8 is an enlarged view of FIG. 7, showing that the piston pin is located at the close position.
Figure 9:
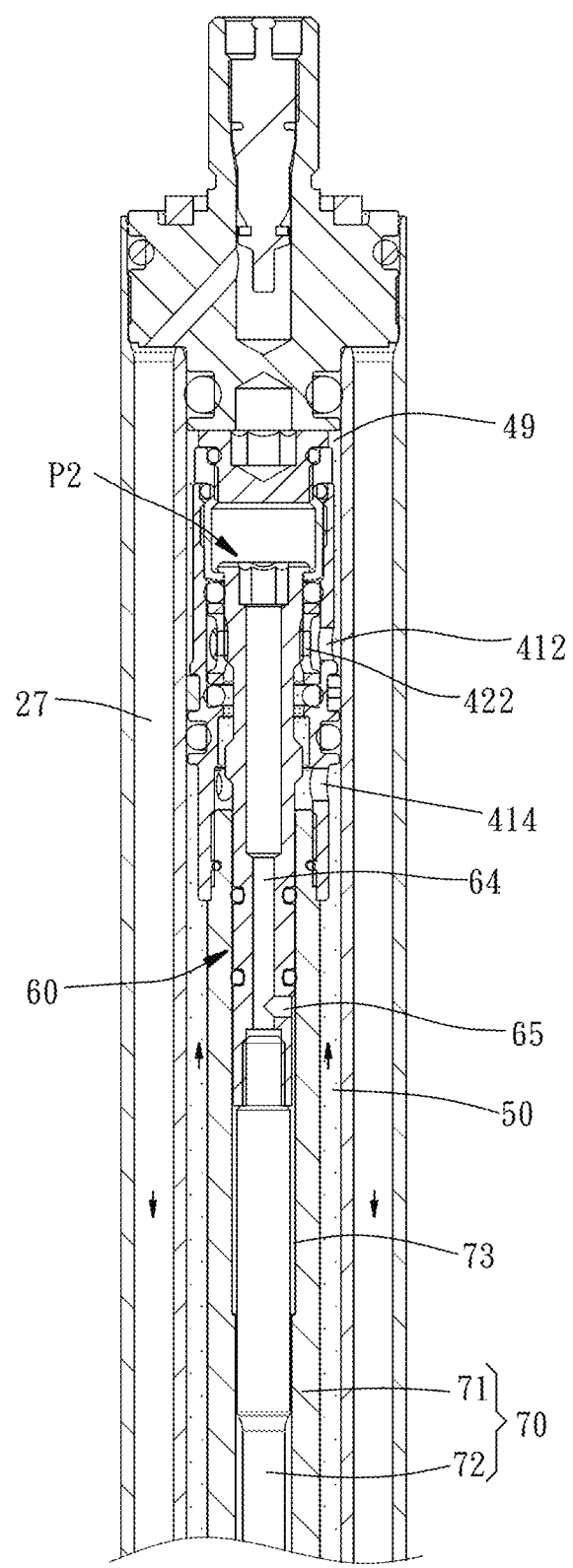
FIG. 9 is similar to FIG. 8, showing that the piston pin is located at the open position.

As shown in FIGS. 3 and 4, the piston pin 60 has a body portion 61, a head portion 62 integrally connected with the top end of the body portion 61, and a force-receiving portion 63 integrally protruding from the outer surface of the body portion 61, so that the force-receiving portion 63 has an outer diameter greater than the outer diameter of the body portion 61. The piston pin 60 is disposed in the piston seat 40 and moved up and down between a close position P1 as shown in FIGS. 4 and 8 and an open position P2 as shown in FIGS. 5 and 9. When the piston pin 60 is located at the close position P1, the first and second oil guide holes 412, 414 of the piston seat 40 are blocked by the force-receiving portion 63 of the piston pin 60, so that the first and second oil guide holes 412, 414 of the piston seat 40 do not communicate with each other. When the piston pin 60 is located at the open position P2, the first and second oil guide holes 412, 414 of the piston seat 40 are not blocked by the force-receiving portion 63 of the piston pin 60, so that first and second oil guide holes 412, 414 of the piston seat 40 communicate with each other. In addition, as shown in FIG. 4, the piston pin 60 has an axial air channel 64 passing through the top and bottom ends thereof, and the bottom end of the piston pin 60 has an air hole 65 radially communicating with the axial air channel 64.

The acting assembly 70 includes a sleeve tube 71 and an acting member 72. As shown in FIGS. 2 and 4, the bottom end of the sleeve tube 71 protrudes out of the bottom end of the outer tube 21, and the top end of the sleeve tube 71 is penetrated in the inner tube 24 and screwed to the bottom end of the seat body 41 of the piston seat 40. The acting member 72 is disposed in the sleeve tube 71 and does not contact with the sleeve tube 71 to form an exhaust channel 73. The top and bottom ends of the exhaust channel 73 communicate with the air hole 65 and the outside, respectively. The bottom end of the acting member 72 protrudes out of the bottom end of the sleeve tube 71, and the top end of the acting member 72 is screwed to the bottom end of the piston pin 60, so that the acting member 72 can drive the piston pin 60 to move from the close position P1 as shown in FIGS. 4 and 8 to the open position P2 as shown in FIGS. 5 and 9. What needs to be added here is that the acting member 72 is not limited to a rod, and a steel wire or cotton wire can also be used to achieve the effect of driving the piston pin 60.

Figure 10:
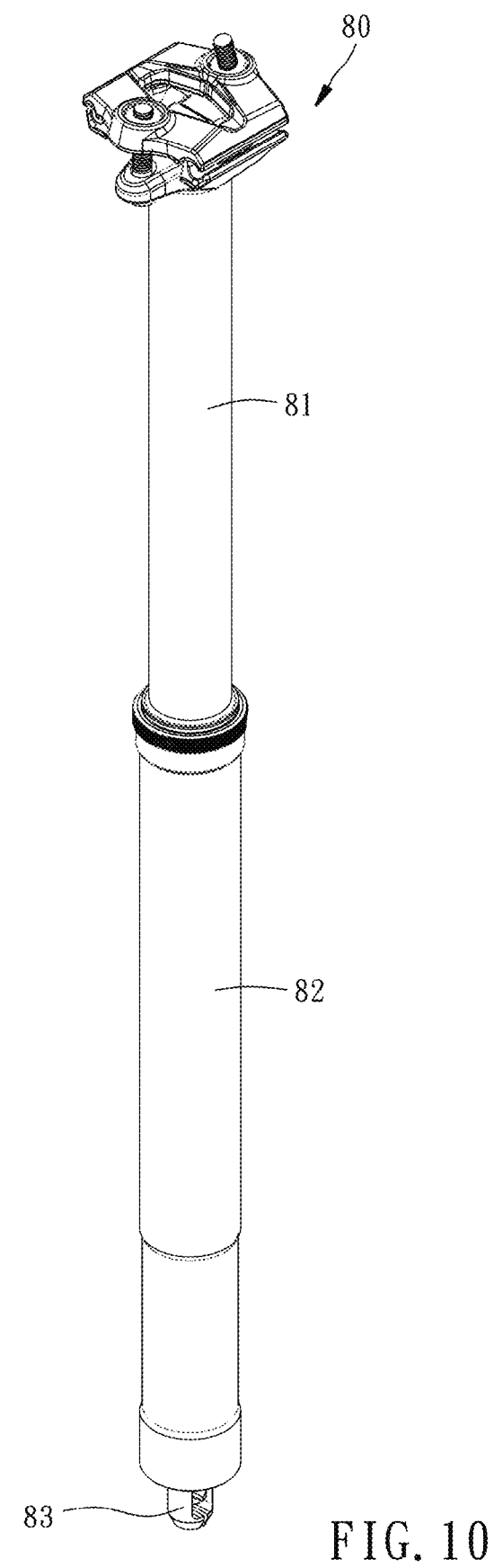
FIG. 10 is a perspective view of a lifting device using the pneumatic-hydraulic control device of the present invention, showing that a lifting tube is lifted to a highest point.
Figure 11:
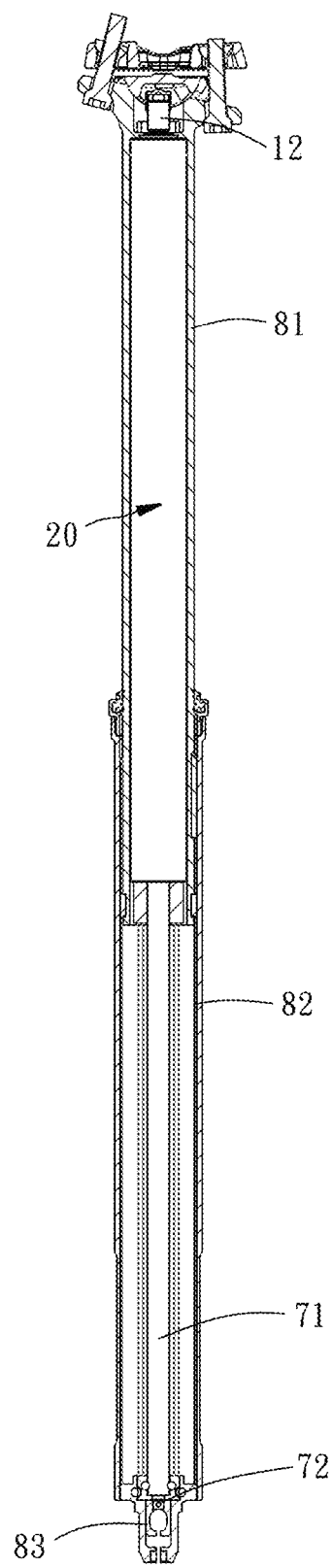
FIG. 11 is a partially sectional view of FIG. 10.
Figure 13:
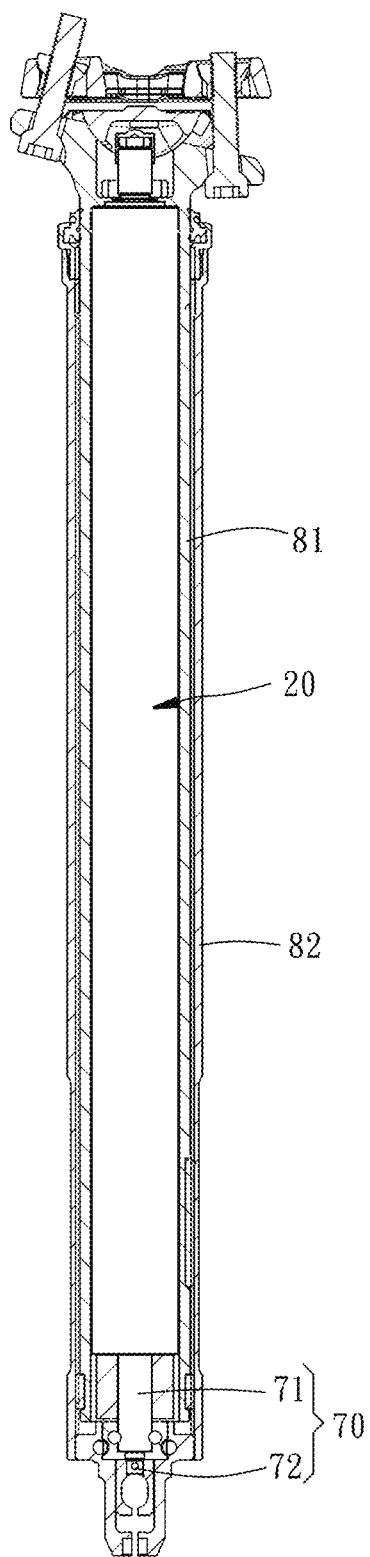
FIG. 13 is a partially sectional view of FIG. 12.

In actual application, the pneumatic-hydraulic control device 10 of the present invention is mainly used with a lifting device 80 as shown in FIG. 10 (in this embodiment, a lifting seat post is taken as an example, but it is not limited to this). As shown in FIGS. 11 and 13, the air inlet valve 12 is fixed to the top end of a lifting tube 81. The top end of the lifting tube 81 is used to be assembled with a seat cushion (not shown). The bottom end of the sleeve tube 71 is fixed to the bottom end of a seat tube 82. The bottom end of the acting member 72 protrudes from the bottom end of the seat tube 82 and is fixed to a cable base 83. The cable base 83 is acted upon by an external force (such as a pull-down force of a cable) to drive the acting member 72 to move downwards. Since the lifting device 80 is conventional and not the key point of the invention, the detailed configuration will not be repeatedly mentioned hereunder.

Figure 12:
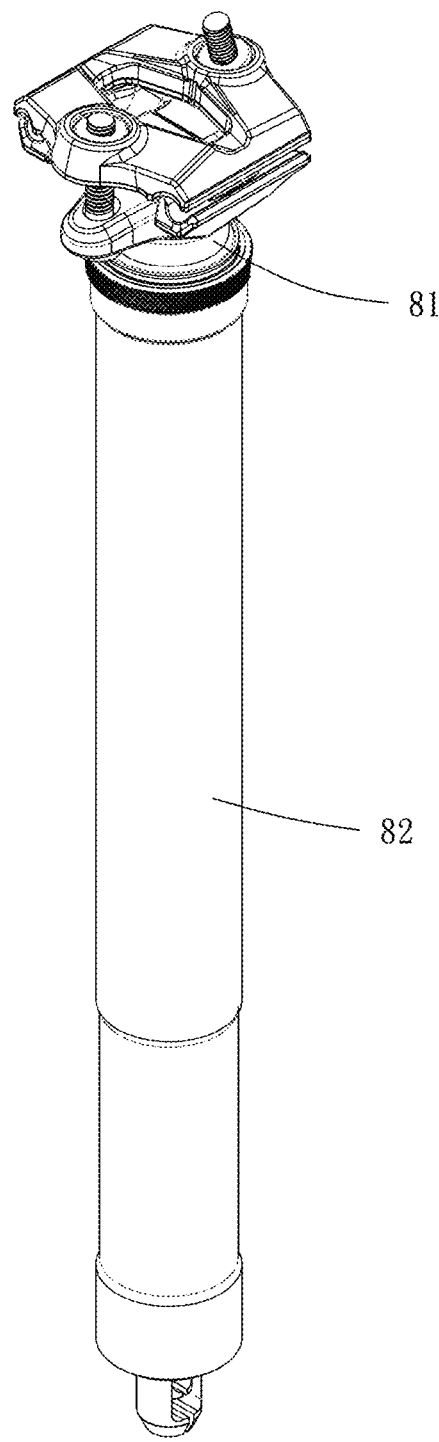
FIG. 12 is similar to FIG. 10, showing that the lifting tube is lowered to a lowest point.

It can be seen from the above that when a rider sits on the seat cushion, a pulling force is exerted on the acting member 72, so that the piston pin 60 is pulled down by the acting member 72 to the open position P2 as shown in FIG. 5. At this time, the hydraulic oil in the first inner oil area 49 is pushed to flow to the second inner oil area 50 through the first oil guide holes 412, the third oil guide holes 422, and the second oil guide holes 414, and then flow from the second inner oil area 50 to the outer oil area 28 through the communicating holes 26. This part of the hydraulic oil pushes the floating piston 29 upwards, so that the floating piston 29 pushes the air in the air area 27. In this way, as shown in FIGS. 12 and 13, the lift tube 81 together with the cylinder 20 are lowered relative to the seat tube 82 and the acting assembly 70. Once the pulling force applied to the piston pin 60 is eliminated, a fluid valve closing force F acting on the force-receiving portion 63 pushes the piston pin 60 back to the close position P1 as shown in FIG. 8, so that the lifting tube 81 together with the cylinder 20 are stopped to be positioned.

After the rider leaves the seat cushion, a pulling force is exerted on the acting member 72, so that the piston pin 60 is pulled down by the acting member 72 to the open position P2 as shown in FIG. 9. At this time, the air in the air area 27 pushes the floating piston 29 downwards, so that the floating piston 29 pushes the hydraulic oil in the outer oil area 28. Thereafter, the hydraulic oil flows from the outer oil area 28 to the second inner oil area 50 through the communicating holes 26, and then flows from the second inner oil area 50 to the first inner oil area 49 through the second oil guide holes 414, the third oil guide holes 422, and the first oil guide holes 412, so that the lifting tube 81 together with the cylinder 20 are lifted relative to the seat tube 82 and the acting assembly 70, as shown in FIGS. 10 and 11. Once the pulling force applied to the piston pin 60 is eliminated, the fluid valve closing force F acting on the force-receiving portion 63 pushes the piston pin 60 back to the close position P1 as shown in FIG. 4, so that the lifting tube 81 together with the cylinder 20 are stopped to be positioned.

On the other hand, as shown in FIG. 3, the top surface of the head portion 62 of the piston pin 60 has a plurality of recesses 66 (in this embodiment, the recess 66 is, but not limited to, four in number; in fact, at least one is sufficient).

When the piston pin 60 is located at the close position P1 as shown in FIGS. 4 and 8, the head portion 62 of the piston pin 60 contacts with the barrel cap 46 of the piston seat 40. However, the recesses 66 are used to prevent the head portion 62 of the piston pin from contacting completely with the barrel cap 46 of the piston seat 40, that is, there is a slight gap between the piston pin 60 and the barrel cap 46. In this way, when the piston pin 60 is pulled downwards by the acting member 72, as shown in FIGS. 5 and 9, an air chamber 67 is formed between the piston pin 60 and the barrel cap 46. The residual air in the air chamber 67 flows through the axial air channel 64 and the air hole 65 to reach the exhaust channel 73, and finally discharges from the exhaust channel 73 to the outside. This can prevent the air chamber 67 from forming a negative pressure state.

Figure 14:
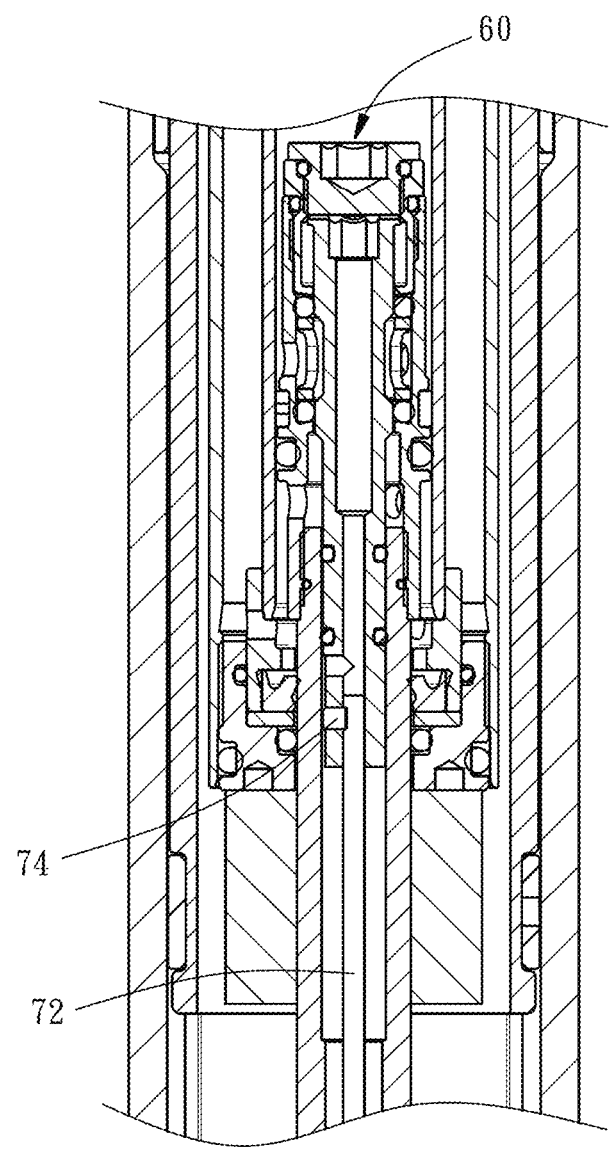
FIG. 14 is a partially sectional view of an acting member provided by the pneumatic-hydraulic control device of the present invention in another embodiment.

Finally, it is necessary to add that the acting member 72 is not limited to be a solid rod, and can also be replaced by a metal wire (such as a steel wire). As shown in FIG. 14, the lateral side of the metal wire is pressed by a pin 74 to increase structural strength, so that the metal wire has enough strength to control the opening and closing of the piston pin 60.

As indicated above, the pneumatic-hydraulic control device 10 of the present invention uses the acting member 72 to directly pull the piston pin 60 along the axial direction of the piston pin 60 to open it. When the piston pin 60 is pulled down, the residual air between the piston pin 60 and the barrel cap 46 flows through the axial air channel 64 and the air hole 65 to reach the exhaust channel 73, and finally discharges from the exhaust channel 73 to the outside. This can prevent the negative pressure state from being generated between the piston pin 60 and the barrel cap 60, thus reducing the operating resistance caused to the piston pin 60.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A pneumatic-hydraulic control device comprising:
a cylinder;
a control valve including a piston seat mounted in the cylinder to form a first inner oil area, a second inner oil area located below the first inner oil area, and an outer oil area communicating with the second inner oil area with the cylinder and having a first oil guide hole communicating with the first inner oil area and a second oil guide hole communicating with the second inner oil area, and a piston pin disposed movably up and down in the piston seat and having a force-receiving portion at an outer surface thereof arranged between the first oil guide hole and the second oil guide hole, wherein when the piston pin is located at a close position, the first and second oil guide holes of the piston seat are blocked by the force-receiving portion of the piston pin, so that the first and second oil guide holes of the piston seat do not communicate with each other, and when the piston pin is located at an open position, the first and second oil guide holes of the piston seat are not blocked by the force-receiving portion of the piston pin, so that first and second oil guide holes of the piston seat communicate with each other, the piston pin having an axial air channel through top and bottom ends thereof and an air hole at the bottom end thereof communicating with the axial air channel; and an acting assembly including a sleeve tube having a top end thereof connected with the piston seat, and an acting member penetrated in the sleeve tube to form an exhaust channel with the sleeve tube, the exhaust channel having top and bottom ends thereof communicating with the air hole and the outside, respectively, the acting member having a top end thereof connected with the bottom end of the piston pin to drive the piston pin to move from the close position to the open position.

2. The pneumatic-hydraulic control device as claimed in claim 1, wherein the cylinder includes an outer tube and an inner tube; the first and second inner oil areas are located between the inner tube and the piston seat; the outer oil area is located between the outer tube and the inner tube; the cylinder further includes an air area located between the outer tube and the inner tube and located above the outer oil area.

3. The pneumatic-hydraulic control device as claimed in claim 2, wherein a floating piston is provided between the outer tube and the inner tube and disposed movably up and down between the air area and the outer oil area.

4. The pneumatic-hydraulic control device as claimed in claim 2, wherein the cylinder further includes an outer bottom cover mounted to a bottom end of the outer tube, and an inner bottom cover inserted in the outer bottom cover and mounted to a bottom end of the inner tube; the outer bottom cover and the inner bottom cover are penetrated by the sleeve tube; the second inner oil area and the outer oil area communicate with each other through a communicating hole provided by the inner bottom cover.

5. The pneumatic-hydraulic control device as claimed in claim 1, wherein the top end of the acting member is screwed to the bottom end of the piston pin.

6. The pneumatic-hydraulic control device as claimed in claim 5, wherein the acting member is a solid rod.

7. The pneumatic-hydraulic control device as claimed in claim 1, wherein a barrel cap is provided at a top end of the piston seat; an air chamber communicating with the axial air channel is formed between the barrel cap and the top end of the piston pin when the piston pin is located at the open position.

8. The pneumatic-hydraulic control device as claimed in claim 1, wherein the acting member is a metal wire; the acting assembly further includes a pin pressing the metal wire with one end.

* * * * *